3,796,791
PROCESS FOR RECLAIMING LIMESTONE MUD
Haagen Bach Nielsen, Glen Ridge, N.J., and Edwin J. Bonner, Staten Island, and Ernest A. Lado, Hastings-on-Hudson, N.Y., assignors to Nichols Engineering & Research Corporation, New York, N.Y.
Filed Dec. 20, 1971, Ser. No. 210,075
Int. Cl. C04b 1/02
U.S. Cl. 423—177                                    5 Claims

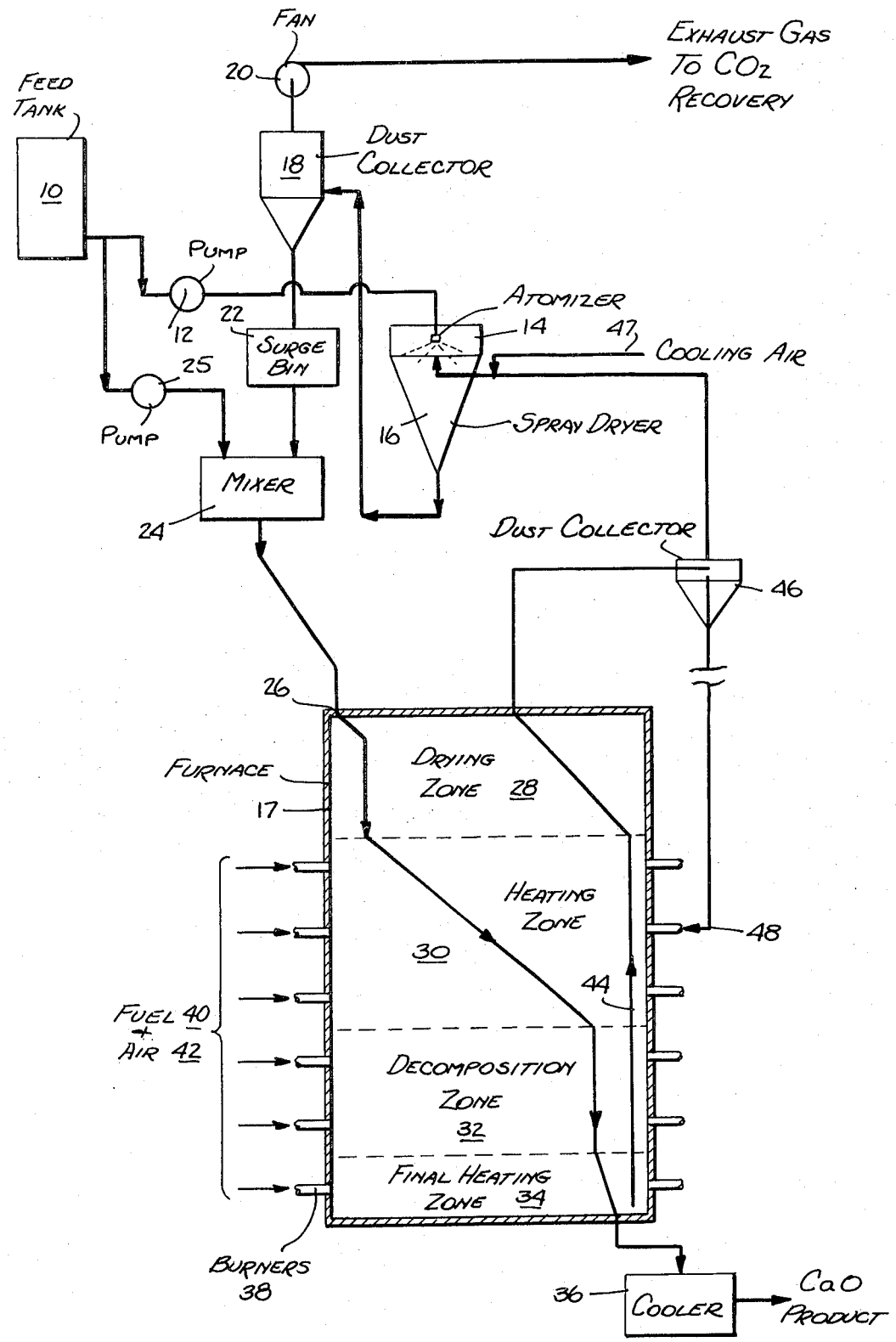

ABSTRACT OF THE DISCLOSURE

Apparatus and process for reclaiming limestone mud wherein a supply of the mud in a wet condition is passed to a spray type dryer and dried to a bone dry free-flowing powder by the use of hot drying exhaust gases from a calciner furnace. The dry powder together with the exhaust gases are then passed to a dust collector for removing substantially all of the fines from the gases. The spent lime powder may then be back-mixed with some of the original spent mud in proportions designed to yield a calciner feed having the desired moisture content for optimum physical condition of both feed and calcined product. The pugged mixture is then conveyed to the top of the calciner furnace and passed downwardly through successive zones including a heating zone, a drying zone, a decomposition zone wherein the spent lime is decomposed into calcined lime and gaseous carbon dioxide, and a second heating zone to increase the density without loss of activity thereof, while passing hot gases upwardly in countercurrent flow with respect to the downwardly flowing spent lime. The calcined lime is discharged at the bottom of the furnace and conveyed to a cooler wherein the temperature is reduced to usable levels for recycling in the system.

---

This invention relates to the reclaiming of limestone mud, and more particularly to improvements in the process of reclaiming whereby fuel savings are achieved with a minimum capital expenditure.

There are many industrial processes which utilize calcined lime, CaO, to aid in the precipitation of undesirable impurities and absorb carbon dioxide, $CO_2$, which is used in decomposition, such as sewage treatment, water treatment and sugar refineries, for example. In view of the large quantities required, the spent lime used in the process is usually reclaimed and recycled through the system.

For example, in the refining of sugar beets using the so-called "Steffen" process, calcined lime is required for saccharate formation. In addition, lime aids in the precipitation of undesirable impurities. The sludge or mud produced by the lime is removed from the system by such means as rotary vacuum filters which produce a filter cake containing between about 50% and about 55% moisture. Usually, this is reslurried and pumped to a centrifuge located adjacent the reclaiming station. A centrifuge operating on a lime-mud slurry produces a cake of about 40% moisture content. A typical lime-mud usually includes about 80% $CaCO_3$; 12.2% inert inorganics and about 7.8% organics on a dry weight basis. It is desirable that the CaO product from the reclaiming process be "light-burned" to yield maximum activity for saccharate formation in a sugar refining process such as the "Steffen" process. It is also desirable that the maximum use be made of the available heat content in the fuel fired, as the economics of lime-mud recovery depend primarily on fuel economy. In addition, it is desirable that the exhaust gases from the system contain as high a percentage of $CO_2$ as possible for efficient use in the recarbonation system. Moreover, the nature of beet sugar factory operation requires dependable and substantially maintenance-free, rugged equipment to insure continuous plant operation.

The present invention involves a novel combination of features combined in such a way as to afford a very efficient solution to the difficulties encountered with the prior art, as will become apparent as the description proceeds.

The invention contemplates a new and improved process for reclaiming limestone mud which includes the steps of passing a supply of the mud, in a wet condition, to a spray type dryer, drying the mud to a bone dry free-flowing powder in said spray dryer by the use of hot drying air from a calciner furnace. The next steps include removing the dry powder from the bottom of the spray dryer together with exhaust gases and passing them to a dust collector, removing substantially all of the fines from the gases and exhausting the gases therefrom. Thereafter, the steps in the process include removing the dried spent lime powder from the dust collector and may then include the step of back-mixing it with some of the original spent mud in proportions designed to yieds a calciner feed having the desired moisture content for optimum physical condition of both feed and calcined product, and then conveying it to the top of the calciner furnace and passing it downwardly through said furnace. Thereafter, the next steps comprise heating and drying the spent lime in a drying zone in the furnace by passing hot gases upwardly in countercurrent flow with respect thereto, passing the spent lime from the drying zone downwardly to a heating zone and heating it by passing hot gases upwardly in countercurrent flow. Thereafter, the steps include passing the spent lime from the heating zone downwardly to a decomposition zone for decomposing same into calcined lime and gaseous carbon dioxide by contact with the upwardly flowing gases, and thence passing the decomposed calcined lime downwardly from the decomposition zone to a second heating zone for increasing the density and improving the physical characteristics without losing the chemical activity thereof, and thereafter discharging the calcined lime and conveying it to a cooler wherein the temperature is reduced. The product is discharged from the cooler and is then ready for recycling through the system.

In another form, this invention is characterized by a system for reclaiming limestone mud which includes a spray dryer for receiving the mud, a calciner furnace, and means for passing hot exhaust gases from the calciner furnace to the spray dryer for drying the mud. In addition, the system includes a dust collector, means for passing dry powder together with exhaust gases from the bottom of the spray dryer to the dust collector. Also, the system according to this invention includes means, such as mechanical conveying means, for conveying the dried spent lime powder from the dust collector to the top of the calciner furnace which has an upper drying zone adjacent the top thereof, a heating zone disposed below the drying zone, a decomposition zone disposed below the heating zone and a second heating zone disposed below the decomposition zone and an exit opening at the bottom thereof. In addition, the system includes a cooler and means for carrying the calcined lime from the exit opening of the furnace to the cooler, which has an outlet for discharging the final calcined lime product.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description and is shown in the accompanying drawing, forming a part of this sepecification.

Referring to the drawing, the system comprises a feed tank 10 containing a supply of spent lime-mud which is to be reclaimed. This material is essentially a precipitated form of calcium carbonate, $CaCO_3$, containing some organics and inert impurities which will be neglected herein for simplifying the description. The lime-mud is in the form of a filter cake or slurry containing free water in the range of between about 40% to about 60% on a wet basis. In the illustrated example, the filter cake contains about 40% free water, and is at approximately 60° F. The system is designated to reclaim about 150 tons per day of CaO product from the lime-mud. A positive displacement type pump 12 takes suction from the base of the tank and delievers the spent mud directly to an atomizer 14 of a spray dryer 16. A spray dryer that is known to be suitable for this use is the 26 ft. diameter Nichols/Niro Model, as commercially manufactured by the Nichols Engineering and Research Corporation.

In the dryer 16 the spent mud enters a drying chamber of the spray dryer at the top through a centrifugal atomizer wheel wherein it is converted into a spray of uniform droplets. Hot drying air is generally utilized in the spray dryer which in this case is actually the exhaust gas, at a temperature of about 1100° F., from a calciner furnace 17, which will be described more fully hereinafter. This air enters the drying chamber at a location just below the atomizer wheel through an adjustable-vane air disperser, thereby accomplishing true cocurrent flow of drying air and spray. The lime mud is dried to a bone dry free-flowing powder in the drying chamber and the dry powder exits from the bottom of this chamber along with exhaust gases at a temperature of about 250° F. and enters a baghouse type dust collector 18.

The bag house collector 18 removes more than about 99.9% of the fine powder from the gases, which are then returned by a fan 20 to a recarbonating station (not shown). These gases are clean and have a temperature of about 250° F. The $CO_2$ content in the gases is about 23.3% on a dry basis. The dry spent lime powder is collected at the bottom of the dust collector and mechanically conveyed to a surge bin 22. Dry powder is drawn from this bin at a controlled rate and mechanically conveyed to a mixer 24 or pug mill wherein the bone dry powder is mixed with a sufficient quantity of fresh mud, having a moisture content of about 40%, received directly from the feed tank 10, through pump 25, to produce a uniform nondusty feed for the calciner furnace 17 at about 16.6% moisture on a wet basis, and at about 125° F.

A furnace that is known to be suitable for use in accordance with this invention is described in U.S. Pat. 3,153,633 issued to C. F. Von Dreusche, Jr. on Oct. 20, 1964. This furnace comprises a series of circular hearths, placed one above the other and enclosed in a refractory-lined steel shell. A vertical rotating shaft through the center of the furnace carries arms with rabble blades which stir the charge and move it in a spiral path across each hearth. Material is fed to the hearth and rabbled across it to pass through drop holes to the next hearth below. It passes in this way over and across each hearth to the bottom of the furnace whereat the product is discharged through one or more ports. Heated gases flow countercurrently to heat the charge to the desired temperature. In the embodiment of the invention illustrated, the spent lime enters the furnace, as indicated at 26, and is heated to and dried at about 212° F. in a drying zone 28. From the drying zone the spent lime feed passes to a heating zone 30 wherein the dry spent lime is heated to about 1660° F. before it passes into a decomposition zone 32. In this zone, at a temperature of about 1660° F. the calcium carbonate, $CaCO_3$, is decomposed into calcined lime CaO and gaseous carbon dioxide $CO_2$, as it moves down through the calciner by contact with gases between about 1850° F. and about 1900° F. passing upwardly through the units in countercurrent flow. In addition, combustion of the organics in the feed is completed in this zone.

The so-decomposed calcined lime is finally heated to a temperature of about 1800° F. in the final heating zone 34. This provides a product of good density and activity. Hot calcined lime is then discharged from the bottom hearth and is conveyed to a cooler 36 wherein the temperature is reduced to about 150 °F. and thence discharged for recycling through the sugar refining process.

In the calciner furnace 17, multiple burners 38 are disposed along the fired hearths which burn natural gas, as indicated by the arrows 40, with some excess air as indicated by the arrows 42. Air for the combustion of the organics in the spent lime is supplied through the burners. The hot gases at a temperature of between about 1850° F. and 1900° F. flow upwardly through the furnace, as indicated at 44, to provide heat in the final heating zone 34, decomposition zone 32, heating zone 30 and drying zone 28. The exhaust gas leaves the calciner furnace at the top hearth at about 1100° F. and passes through a cyclone type dust collector 46 to remove entrained fines prior to recycling of these gases to the spray dryer 16 wherein they are used in predrying, as was discussed more fully hereinbefore. Minor amounts of cooling air, as indicated by arrow 47, may be added to the spray dryer for purposes of internal cooling of exposed surfaces and protection seals. The fines collected inside the cyclone are recycled back into one of the hearths of the calciner furnace, as indicated by arrow 48 in the drawing.

It will be understood that the limestone material as referred to herein denotes essentially a chemically precipitated calcium carbonate material usually having some inert and/or organic contaminants plus free moisture.

While the above example is addressed to a beet sugar refining process and the regeneration of calcined lime associated therewith, the invention is directed to a wide variety of processes requiring the regeneration of calcined lime.

It will thus be seen that the present invention does indeed provide an improved system and process for reclaiming limestone mud which is superior in operability, reliability, economy and efficiency, as compared to such prior art systems.

What is claimed and desired to be secured by Letter Patent:

1. A process for reclaiming limestone mud comprising the steps of passing a supply of said mud having a moisture content of between about 40% and about 60% on a wet basis from a feed tank to a spray type dryer, drying said mud to a bone dry free-flowing powder in said spray dryer by use of exhaust gas, removing said dry powder from the bottom of said spray dryer together with exhaust gases and passing same to a dust collector, removing substantially all of the fines from the gases and passing said gases to a recovery system, removing the dried spent lime powder from said dust collector and conveying it to a surge bin, drawing dry powder from said surge bin at a controlled rate and conveying it to a mixer, drawing a supply of mud having a mixer content of between about 40% and about 60% on a wet basis from said feed tank for forming a uniform non-dusty mixture of spent lime having a selected moisture content in said mixer, feeding the mixture of spent lime from the mixer to the top hearth of a calciner furnace and passing it downwardly through said furnace by rabbling it spirally across each hearth before dropping it through drop holes to the next hearth therebelow, heating and drying said spent lime in a drying zone of the calciner furnace by passing hot gases upwardly in countercurrent flow with respect thereto, passing said spent lime from the drying zone downwardly to a heating zone for raising the temperature thereof from about 212° F. to about 1660° F. by passing hot gases upwardly in countercurrent flow with respect thereto, passing said spent lime from the heating zone downwardly to a decomposition zone, decomposing said spent lime into calcined lime and gaseous carbon dioxide in said decomposition zone by contact with upwardly flowing gas, passing the decomposed calcined lime downwardly from said decomposition zone to a second heating zone, heating said calcined lime in said second heating zone from about 1660° F. to about 1800° F. by passing hot gases upwardly in countercurrent flow with respect thereto to increase the density without loss of chemical activity thereof, discharging calcined lime and conveying it to a cooler, reducing the temperature of said calcined lime in said cooler and then discharging the calcined lime product from said cooler, while simultaneously exhausting the hot gases that flowed upwardly through the calciner furnace to an exhaust cyclone type dust collector, removing entrained fines from said exhaust gases in said exhaust gas dust collector, removing the gas from said exhaust gas dust collector, said so removed exhaust gases being the exhaust gases used in said spray dryer.

2. A proces for reclaiming limestone mud according to claim 1, wherein the temperature of said spent lime in said spray dryer is raised from about 60° F., to about 250° F.

3. A process for reclaiming limestone mud according to claim 1, wherein the temperature of said spent lime in said drying zone is about 212° F.

4. A process for reclaiming limestone mud according to claim 1 wherein the temperature of said spent lime in said decomposition zone is about 1660° F.

5. A process for reclaiming limestone mud according to claim 1 wherein the temperature of said calcined lime in said cooler is lowered from about 1800° F. to about 150° F.

References Cited

UNITED STATES PATENTS

| | | | |
|---|---|---|---|
| 2,194,164 | 3/1940 | Daniels | 423—175 X |
| 3,203,761 | 8/1965 | Neuville | 423—177 |
| 3,669,430 | 6/1972 | Copeland | 263—53 R |
| 2,290,068 | 7/1942 | Petersen | 263—53 R |

OTHER REFERENCES

Kirk-Othmer, "Encyclopedia of Chemical Technology," vol. 12, 2nd edition; pp. 438–440.

EDWARD J. MEROS, Primary Examiner

U.S. Cl. X.R.

423—175, 637